Aug. 13, 1963         S. G. SMART         3,100,725
EXTRACTION OF SUGAR JUICE WITH SCREW PRESS
Filed Oct. 13, 1959
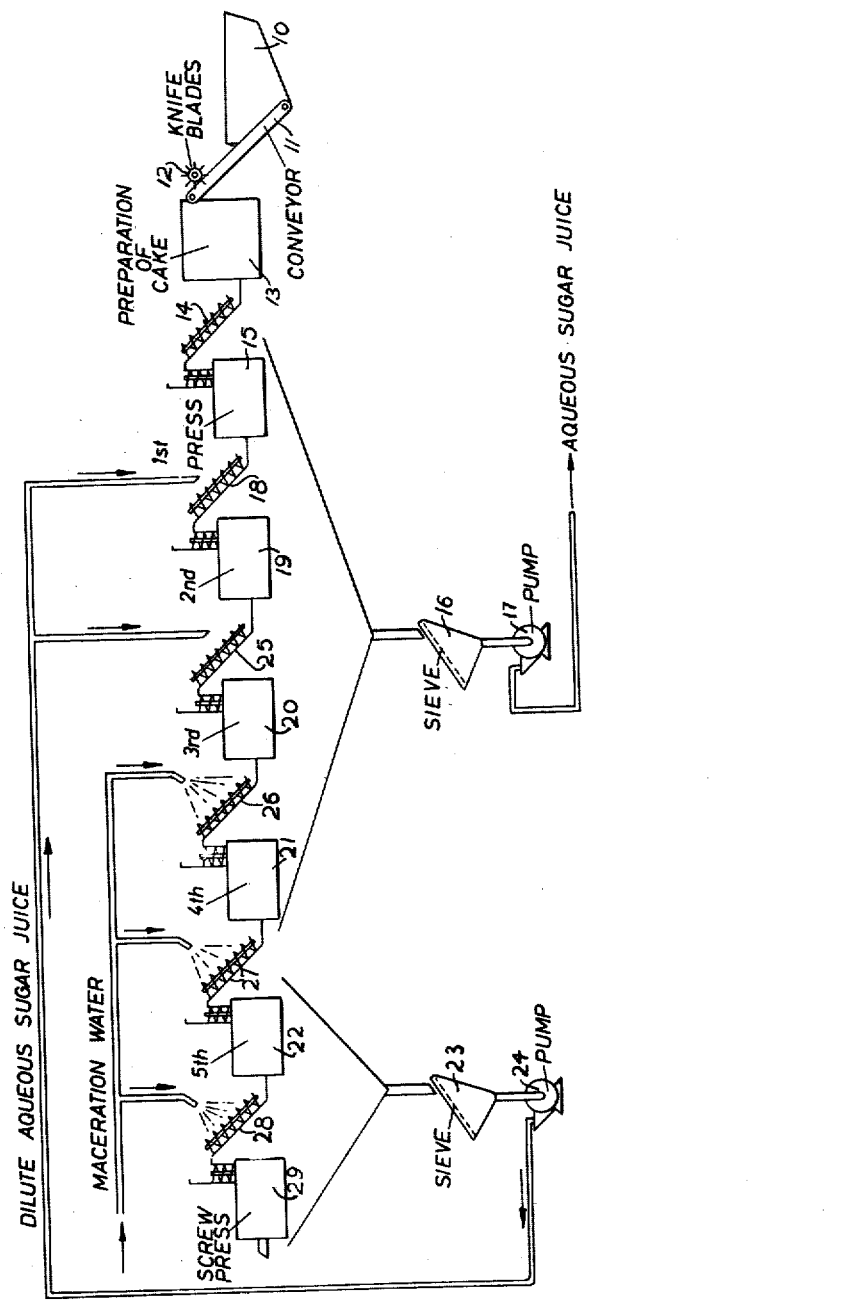
INVENTOR
STANLEY GORDON SMART
BY
ATTORNEYS

United States Patent Office 3,100,725
Patented Aug. 13, 1963

3,100,725
EXTRACTION OF SUGAR JUICE WITH SCREW PRESS
Stanley Gordon Smart, London, England, assignor to Rose, Downs & Thompson, Limited, Hull, Yorkshire, England
Filed Oct. 13, 1959, Ser. No. 846,117
Claims priority, application Great Britain Oct. 15, 1958
5 Claims. (Cl. 127—43)

The present invention relates to improvements in or relating to sugar manufacture, and is particularly concerned with the extraction of sugar juice from sugar cane.

In the extraction of sugar juice from sugar cane the cane is first treated to render it into a form suitable for extracting the sugar juice therefrom. The preparation of the cane as delivered may be effected in a number of ways. Thus, it may be passed through one set of knives and then through a shredder or crusher, and then through a three-roll mill or a two-roll crusher. Other methods can, of course, be employed depending on the particular cane supplied and the particular extraction plant.

In all cases, the effect of the preparation is to rupture at least a substantial proportion of the cells which contain the sugar and thus enable the sugar to be extracted from the cane by subsequent treatment.

In the following description and claims, the expression "prepared sugar cane" is to be understood as referring to sugar cane in which at least a substantial proportion of the cells containing the sugar have been ruptured.

The extraction of sugar from prepared sugar cane has hitherto been effected either by the diffusion process or by pressing between one or more sets of milling rolls, usually from four to six sets of rolls being used. In the latter case, the fibrous residue from each set of rolls is termed "bagasse," that resulting from the first set of rolls being termed "first mill bagasse," that from the second set "second mill bagasse," and so on, the residue leaving the final set of rolls being termed "final bagasse."

Final bagasse is frequently used as a fuel, particularly in the cane sugar industry. For this purpose, however, the water content of the residue should be as low as possible. In the hitherto known process for extraction of sugar juice from sugar cane, the fibrous residue has a water content which lies in general in the range of 50% to 55% by weight. The residue from the known extraction process, whilst utilisable as a fuel, is not, therefore, in the best form for this purpose.

In addition to the water content, the fibrous residue remaining after milling also contains a proportion of sugar which has not been removed by the extraction process, and if the material is used as a fuel, this sugar is lost.

Similar considerations apply to the fibrous residue resulting from the diffusion process. For convenience, the expression "final bagasse" is to be understood as including not only fibrous residues resulting from a series of milling roll sets, but also that resulting from any other extraction process such as the diffusion process.

It is an object of the present invention to provide a process for extracting sugar juice from sugar cane in which an improved yield of sugar is obtained and which enables the water content of the final bagasse to be reduced to a point which renders the fibrous residue more suitable for use as a fuel.

As indicated above, the water content of the final bagasse resulting from a series of milling roll sets is 50% to 55% by weight. It has now been found that if the final bagasse is pressed through a screw press, the water content of the resulting fibrous residue is considerably reduced below that of the final bagasse. Thus, it has been found that by pressing the final bagasse through one or more screw presses, the final water content of the fibrous residue can be reduced to substantially 40% by weight.

Thus, when samples of final bagasse from the conventional process using milling rolls was pressed through a screw press, the following results were achieved.

| Capacity, lb./hr. | Bagasse | | | | | | Juice | | |
|---|---|---|---|---|---|---|---|---|---|
| | Moisture | | | Sucrose | | | Brix | Suc. | Pur. |
| | In | Out | Diff. | In | Out | Diff. | | | |
| (1) 1,620 | 53.7 | 46.1 | 7.6 | 1.9 | 1.7 | 0.2 | 3.7 | 2.78 | 75.1 |
| (2) 1,975 [1] | 52.6 | 43.3 | 9.3 | 2.0 | 1.6 | 0.4 | 3.3 | 2.6 | 78.8 |
| (3) 2,580 | 52.9 | 44.0 | 8.9 | 1.9 | 1.5 | 0.4 | 3.51 | 2.68 | 76.4 |
| (4) 2,072 [1] | 51.7 | 43.6 | 8.1 | 2.2 | 1.7 | 0.5 | 2.61 | 2.09 | 80.1 |

[1] Maceration water added.

In the above table the expression "brix" stands for the amount of soluble solids present in the juice and the purity is the percentage of sugar in the total soluble solids. In the case of Examples 1 and 3 in the table, the bagasse was passed through the screw press without further treatment, but in the case of Examples 2 and 4 in the table, maceration water was added to the bagasse before it was pressed through the screw press.

According to the present invention, therefore, an improved process is provided for extracting sugar juice from sugar cane which comprises preparing the sugar cane, extracting sugar juice from the prepared cane to leave a final bagasse, and pressing the final bagasse through one or more screw presses.

When the shredded material is passed through a series of milling roll sets, it is generally sufficient to pass the pressed material through a single screw press. In this embodiment of the invention, the screw press effectively acts to de-water the cane bagasse produced during the pressing between the rolls.

It has further been found, however, that if the prepared sugar cane is passed through one or more screw presses, not only is the final water content lower, but for a given operational horse-power, the amount of sugar extracted is greater, and the purity of the resultant product is higher than that achieved by milling rolls (and in the overall extraction by the diffusion process).

According to another embodiment of the invention, therefore, a process is provided for the extraction of sugar from sugar cane in which the cane is first prepared and the prepared sugar cane is then passed through one or more screw presses. In this method, the final screw press effectively acts to de-water the bagasse. A typical plant for carrying out this embodiment of the invention is illustrated diagrammatically in the accompanying drawing.

Due to the unexpected increase in efficiency when using screw presses, it is possible to reduce the number of operations to be carried out on the prepared sugar cane.

The capital cost of equipment is also substantially lowered.

If desired, the extraction of the sugar can be undertaken partly by conventional means and partly by means of screw presses. Thus, when a set of milling rolls is to be replaced in a conventional system, the replacement can be a screw press. In this manner, the changeover from the conventional process to the preferred embodiment of the invention can be effected gradually and the capital cost spread over a period of time.

After the prepared sugar cane has been pressed once, the further extraction of juice is facilitated by adding either dilute aqueous juice or water to the bagasse before each subsequent pressing. Thus, the dilute aqueous juice resulting from the last two or three pressings is recycled and sprayed onto the bagasse leaving the first and second screw presses or sets of rolls. Water, usually termed "maceration water" is sprayed onto the bagasse before it enters the third and subsequent screw presses or sets of rolls.

It has been the practice formerly to convey the bagasse between the sets of rolls in the form of a layer which may be several inches thick. This manner of conveying the bagasse does not, however, lend itself to efficient mixing of the bagasse with the maceration water or dilute aqueous juice which is sprayed onto the bagasse while it is being conveyed.

According to another feature of the invention, the bagasse is conveyed between the screw presses and/or sets of rolls by means of a screw conveyor. The screw conveyor, in addition to conveying the bagasse, effects a positive mixing of the maceration water or dilute aqueous juice with the bagasse, thus effecting a more thorough and intimate contact mixing of the maceration water or added dilute aqueous juice with the juice still remaining in the bagasse. The length of the conveyor should be as short as possible consonant with adequate mixing of the bagasse with the maceration water or added dilute aqueous juice.

A screw press normally consists of a continuous or discontinuous worm, surrounded by a straining cage, the annular volume between the worm and the cage at the discharge end of the worm being less than that at the feed end of the worm. This reduction in volume may be achieved by making the boss diameter or screw diameter at the discharge end or compression end of the worm greater than that at the feed end of the worm. A further compressive effect may be achieved by reducing the pitch of the screw at the compression end of the worm.

Preferably the screw press shall be provided with vertical feed to the inlet thereof, a vertical screw being incorporated into the feed system to effect a controlled feeding of the material (i.e. prepared cane or bagasse) into the screw press.

In the preparation of the sugar cane, a certain amount of juice is invariably pressed out of the cane. According to a further feature of the invention, this juice is recovered in the form of an aqueous solution in that the preparation of the cane is effected by subjecting the cane to the action of a shredder or crusher submerged in a medium of water. In this manner, the advantages inherent in the diffusion process can be introduced into the method of the invention which involves the use of pressing equipment.

The invention will be further illustrated by reference to the accompanying drawing which is a diagrammatic representation in flow sheet form of the method of the invention.

Referring to the drawing, sugar cane is loaded into hopper 10 and is conveyed by conveyor 11 through knife blades 12 which cut the cane into appropriate lengths to a preparation system 13. The preparation system comprises a shredder or crusher and a set of milling rolls which effect rupture of a major proportion of the sugar containing cells in the cane. The prepared cane is then transported by conveyor 14 which is preferably a screw conveyor as shown, to a first screw press or set of rolling mills 15 where it is pressed, the sugar extracted being collected and conveyed to sieve 16 and thence via a pump 17 to storage.

The bagasse leaving the first press or set of rolls is conveyed via conveyor 18 to a second press or set of rolling mills 19 where the procedure is repeated. The bagasse is treated in the same manner in the third and fourth presses or sets of rolling mills 20 and 21 respectively. The bagasse leaving the fourth press or mill is conveyed to a fifth press or mill 22 where it is again pressed, but the now dilute aqueous juice is collected separately, passed through a sieve 23 and conveyed via pumps 24 to the material being conveyed and sprayed over the bagasse being conveyed on conveyors 18 and 25. The bagasse leaving the fifth press is conveyed to a screw press 29 which gives the bagasse a final pressing the extracted dilute aqueous juice being conveyed to sieve 23 for recirculation as before. Water is added to the bagasse on conveyors 26, 27 and 28. It will be appreciated that the number of screw presses or rolling mills can be varied and further that all the pressing units except the last can be either screw presses or rolling mills, but are preferably screw presses. The conveyors are also preferably screw conveyors.

I claim:

1. A process for the extraction of sugar juice from sugar cane comprising, cutting the sugar cane into appropriate lengths, crushing the cut lengths of cane to rupture a substantial proportion of the cells containing sugar and, passing the prepared cane through at least one screw press whereby to extract sugar juice from the crushed cane.

2. A process for extracting sugar juice from sugar cane which comprises rupturing a substantial proportion of the cells containing sugar to produce prepared sugar cane, passing the prepared cane through a series of sets of milling rolls and thereafter through at least one screw press, whereby to effect extraction of sugar juice from prepared sugar cane.

3. A process of extracting sugar juice from sugar cane which comprises crushing the sugar cane to rupture at least a substantial proportion of the cells of the sugar cane which contain sugar to form the prepared sugar cane, passing the prepared sugar cane through a first screw press to form first bagasse, adding dilute aqueous sugar juice to the first bagasse, passing the thus treated first bagasse through a second screw press, and continuing to alternately add dilute aqueous sugar juice and pressing the resulting treated bagasse until the sugar juice obtained from the pressing of the bagasse is dilute aqueous juice and thereafter alternately adding water to the bagasse and pressing the bagasse in a screw press until a final bagasse is obtained.

4. In the process of extracting sugar juice from sugar cane which comprises crushing the sugar cane to rupture at least a substantial proportion of the cells of the sugar cane which contain sugar to form the prepared sugar cane, passing the prepared sugar cane through a first set of milling rolls to form first bagasse, adding dilute aqueous sugar juice to the first bagasse, passing the thus treated first bagasse through a second set of milling rolls, and continuing to alternately add dilute aqueous sugar juice and pressing the resulting treated bagasse until all the sugar juice from the pressing of the bagasse is dilute aqueous juice and thereafter alternately adding water to the bagasse and pressing the bagasse in a set of milling rolls until a final bagasse is obtained, the improvement whereby the water and sugar juice content of the final bagasse is further decreased comprising passing the said final bagasse through a screw press.

5. A process for extracting sugar juice from sugar cane which comprises cutting the cane into appropriate lengths, crushing the cut lengths of cane to rupture a substantial proportion of the cells containing sugar to produce prepared sugar cane, passing the prepared sugar cane through a first press to form first bagasse, adding dilute aqueous sugar juice to the first bagasse, passing the thus treated first bagasse through a second press, and continuing to alternately add dilute aqueous sugar juice and pressing the resulting treated bagasse until the sugar juice is dilute aqueous juice, and thereafter adding water to the bagasse and pressing the bagasse in a screw press to obtain a final bagasse, and passing the final bagasse through a screw press to reduce the water content thereof.

References Cited in the file of this patent

UNITED STATES PATENTS

| | | |
|---|---|---|
| 757,295 | Gibbens et al. | Apr. 12, 1904 |
| 1,006,311 | Stiffen | Oct. 17, 1911 |
| 1,185,009 | Searby | May 30, 1916 |

FOREIGN PATENTS

| | | |
|---|---|---|
| 15,355 | Great Britain | Sept. 11, 1902 |

OTHER REFERENCES

British Specification Abridgment 23,415, December 21, 1900; Cl. 127, Sugar.

Notice of Adverse Decision in Interference

In Interference No. 93,984 involving Patent No. 3,100,725, S. G. Smart, Extraction of sugar juice with screw press, final judgment adverse to the patentee was rendered July 16, 1964, as to claims 1 and 2.

[*Official Gazette October 27, 1964.*]